United States Patent
Sotriffer et al.

(10) Patent No.: US 11,586,179 B2
(45) Date of Patent: Feb. 21, 2023

(54) OPERATOR CONTROL UNIT FOR A FIELD DEVICE USED IN AUTOMATION TECHNOLOGY

(71) Applicant: Endress+Hauser Process Solutions AG, Reinach (CH)

(72) Inventors: Ingomar Sotriffer, Gundelfingen (DE); Vincent de Groot, St. Louis (FR)

(73) Assignee: Endress+Hauser Process Solutions AG, Reinach (CH)

( * ) Notice: Subject to any disclaimer, the term of this patent is extended or adjusted under 35 U.S.C. 154(b) by 917 days.

(21) Appl. No.: 16/471,023

(22) PCT Filed: Nov. 22, 2017

(86) PCT No.: PCT/EP2017/080044
§ 371 (c)(1),
(2) Date: Jun. 19, 2019

(87) PCT Pub. No.: WO2018/114183
PCT Pub. Date: Jun. 28, 2018

(65) Prior Publication Data
US 2019/0377329 A1   Dec. 12, 2019

(30) Foreign Application Priority Data
Dec. 19, 2016  (DE) ..................... 10 2016 124 739.1

(51) Int. Cl.
*B25J 9/16*   (2006.01)
*G05B 19/418*   (2006.01)

(52) U.S. Cl.
CPC .. *G05B 19/418* (2013.01); *G05B 2219/31229* (2013.01)

(58) Field of Classification Search
CPC ...... G05B 19/4155; G05B 2219/31229; G06N 20/00; G06F 8/60; G06F 21/6218;
(Continued)

(56) References Cited

U.S. PATENT DOCUMENTS 5,892,939 A    4/1999  Call et al.
6,331,935 B1 * 12/2001 Baran .................. G06F 1/1632
                                                      361/679.41
(Continued)

FOREIGN PATENT DOCUMENTS

DE   102007035158 A1   1/2009
WO     2008012738 A2   1/2008

OTHER PUBLICATIONS

Carolina et al., Design, elaboration and implementation of 4-20mA current to profibus PA converter, 2011, IEEE, p. 1-6.*
(Continued)

*Primary Examiner* — Mcdieunel Marc
(74) *Attorney, Agent, or Firm* — Kelly J. Smith; Endress+Hauser (USA) Holding, Inc.

(57) ABSTRACT

An operator control unit for a field device used in automation technology includes a first operating system that includes an application program executable on the first operating system, and an emulation algorithm designed to execute, on the application program, application software executed on a second operating system. The application software has at least one communication protocol for coding/decoding telegrams transmitted to/from the field device and is designed to operate the field device, in particular to read, display and modify parameters of the field device, and/or to read and display measured values of the field device.

13 Claims, 1 Drawing Sheet

(58) Field of Classification Search
CPC .. G06F 30/27; G06F 8/71; H04L 41/16; B25J 9/163; B25J 9/1661; G06Q 10/10
See application file for complete search history.

(56) References Cited

U.S. PATENT DOCUMENTS

| | | | | |
|---|---|---|---|---|
| 8,954,016 | B2* | 2/2015 | Seiler | H04Q 9/00 455/67.11 |
| 10,413,079 | B2* | 9/2019 | Luciano | H05B 47/16 |
| 2003/0039212 | A1* | 2/2003 | Lloyd | H04L 45/22 370/252 |
| 2007/0064715 | A1* | 3/2007 | Lloyd | H04L 41/0823 370/401 |

OTHER PUBLICATIONS

Nagy-Kulcsar et al., Developing Simulation Models of Open Distributed Control System—Design Concepts Based on Foundation Fieldbus, 2006, IEEE, pg.*
Valentina et al., Human machine interface for Virtual Prototyping of Industrial Instruments, 2013, IEEE, p. 270-275.*
Kastner et al., EDDL inside FDT/DTM, 2004, IEEE, p. 365-368.*
Ito, Device configuration software development on EDDL and FDT/DTM environment, 2008, IEEE, p. 929-932 (Year: 2008).*
Ito, Extending field device functionality using FDT/DTM technology, 2010, IEEE, p. 716-720 (Year: 2010).*
Bucci et al., A distributed measurement architecture for industrial applications, 2003, IEEE, p. 165-174 (Year: 2003).*
Neugschwandtner et al., Programming fieldbus nodes: a RAD approach to customizable applications, 2005, IEEE, p. 1061-1064 (Year: 2005).*

* cited by examiner

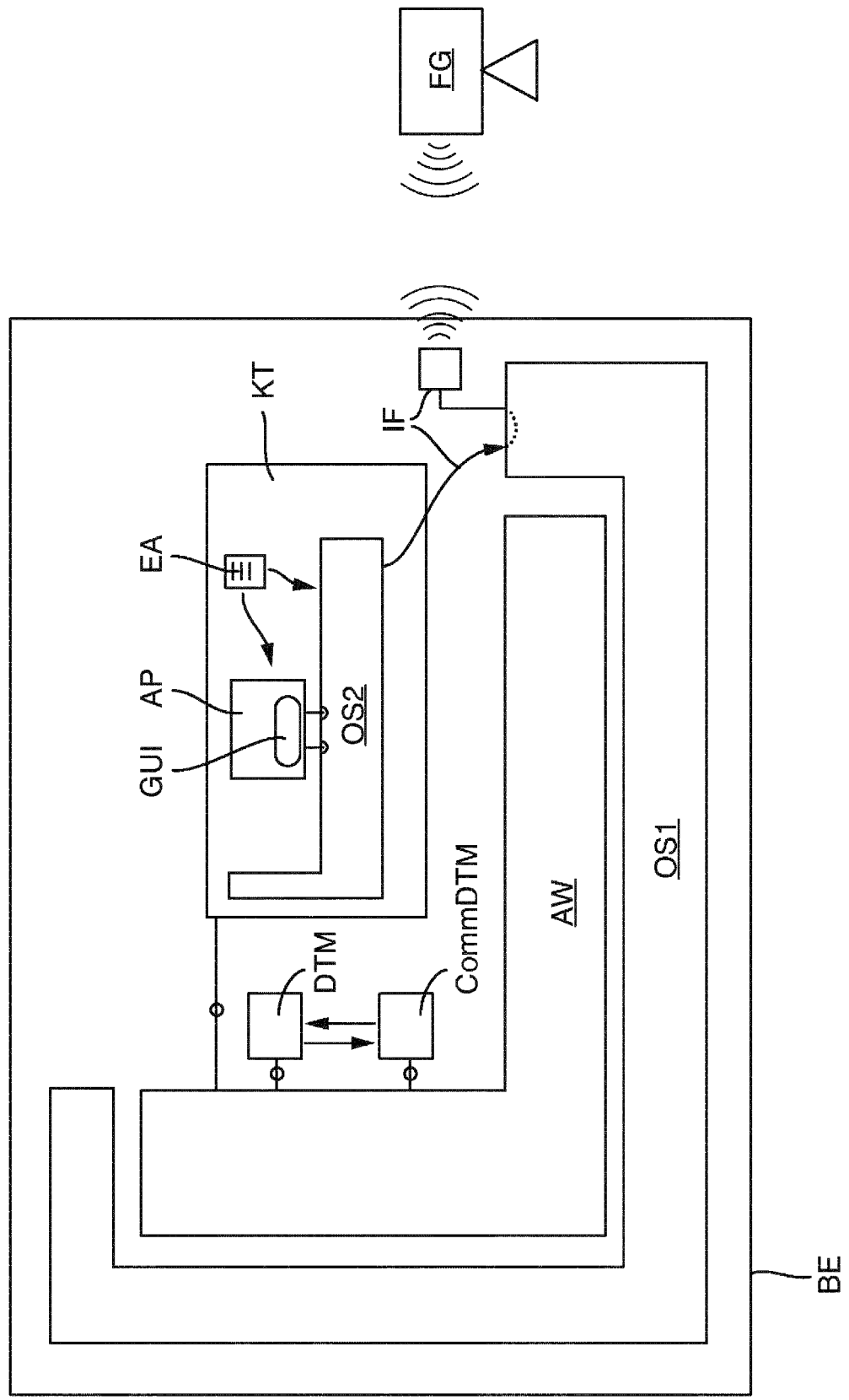

OPERATOR CONTROL UNIT FOR A FIELD DEVICE USED IN AUTOMATION TECHNOLOGY

CROSS-REFERENCE TO RELATED APPLICATIONS

The present application is related to and claims the priority benefit of German Patent Application No. 10 2016 124 739.1, filed on Dec. 19, 2016 and International Patent Application No. PCT/EP2017/080044 filed on Nov. 22, 2017, the entire contents of which are incorporated herein by reference.

TECHNICAL FIELD

The invention relates to an operator control unit for a field device used in automation technology. The invention further relates to a generic communication driver and an application program for use in the operator control unit.

BACKGROUND

Field devices that are used in industrial facilities are already known from the prior art. Field devices are often used in process automation, as well as in manufacturing automation. Field devices, in general, refer to all devices which are process-oriented and which supply or process process-relevant information. Field devices are thus used for detecting and/or influencing process variables. Measuring devices or sensors are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

In modern industrial plants, field devices are usually connected to higher-level units via communication networks such as, for example, fieldbuses (Profibus®, FOUNDATION® Fieldbus, HART® etc.). Higher-level units are control units, such as an SPS (storage programmable controller) or a PLC (programmable logic controller). The superordinate units are used for process control as well as for commissioning the field devices, among other things. The measured values detected by the field devices, especially by sensors, are transmitted via the respective bus system to a (or possibly several) superordinate unit(s) that further process the measured values, as appropriate, and relay them to the control station of the installation. The control station serves for process visualization, process monitoring, and process control via the superordinate units. In addition, data transmission from the higher-level unit via the bus system to the field devices is also required, in particular for configuration and parameterization of field devices and for controlling actuators.

To operate the field devices, corresponding operating programs (operating tools) are necessary which either run independently on the higher-level units (Endress+Hauser FieldCare, Pactware, AMS Fisher-Rosemount, PDM Siemens) or are integrated into the control station's applications (Siemens PCS7, ABB Symphony, Emerson Delta V). The term "operating" means, inter alia, parameterizing the field device, updating the field device, and/or querying and visualizing process data and/or diagnostic data of the field device.

Field devices are integrated into such operating programs via device drivers or via device descriptions. These are provided by the device manufacturers so that the higher-level units, or the operating programs running on these higher-level units, can recognize and interpret the significance of the information supplied by the field devices.

An electronic device description language (EDDL), which is defined in the IEC 61804 standard, was created in the collaboration between the Fieldbus Foundation, the HART Communication Foundation, and the Profibus Nutzerorganisation.

Special device drivers, what are known as DTMs (device type managers), which correspond to the FDT (field device tool) specifications are available for a complete operation of the field devices. The FTD specifications standardized in the IEC 62453 standard were developed by the PNO (Profibus Nutzer Organisation) in cooperation with the ZVEI (Zentralverband Elektrotechnik- and Elektroindustrie).

Many field device manufacturers supply corresponding DTMs for their field devices. The DTMs encapsulate all variables and functions of the respective field device and usually offer a graphical user interface for operating the devices.

In addition to the higher level units, operator control units are frequently used for operating the field devices. These operator control units are either laptops or mobile operator control units, and are connected to the fieldbus network for communication with the field devices. An example of such a mobile device is the "Field Xpert" which is produced and distributed by the applicant. Corresponding device drivers or device descriptions are also required for this.

Field devices are often equipped with additional communication interfaces via which the field devices may be operated by means of an additional communication channel, which is independent of the fieldbus network, per operator control unit. Frequently, they are special service interfaces, for example those of a CDI interface implemented in the applicant's field devices, or are USB interfaces. In addition to such wired connection possibilities, the number of field devices available on the market which have a radio interface for operating purposes has meanwhile been increasing. This radio interface is often designed as a Bluetooth radio interface.

The current trends from the cellphone and smartphone industry also encroach on the field device market. Nowadays, several manufacturers of field devices offer special programs, what is known as application software, apps for short, for smartphones and other mobile terminals, such as tablets and watches, which enable field devices to be operated by means of such a smartphone via the aforementioned radio interface of a field device. These application softwares often offer the advantage that, in contrast to conventional operating methods, they are understood intuitively and allow a user to perform most basic operations and/or maintenance functions of a field device in a simple manner.

However, to date there is no standard for such application software, so that each manufacturer of field devices offers its own concept, and often each individual field device type requires a separate application software. In addition, many field devices do not yet have any app available, which is why these field devices need to be operated in a conventional manner by means of drivers or device descriptions (DTM- or EDDL-based). For this purpose, a service technician needs to carry a computer unit in addition to the smartphones executing the application software, in order to be able to fully operate and/or service all field devices in a system. Even if the field devices to be operated by the service technician can be operated via smartphone, the service technician nevertheless frequently requires a separate computer unit, for example in order to log his activities or to obtain instructions via the computer unit as to which interactions can be carried out with which field devices.

SUMMARY

Starting from this problem, the object forming the basis of the invention is to provide an operator control unit which simplifies the operating and maintenance of field devices.

The object is accomplished via an operator control unit for a field device used in automation technology, having a first operating system, which operator control unit comprises:
- an application program which can be executed on the first operating system of the operator control unit; and
- an emulation algorithm which is designed to execute, on the application program of the operator control unit, application software which can be executed on a second operating system and has at least one communication protocol for coding/decoding telegrams transmitted to/from the field device, and is designed to operate the field device, in particular to read, display, and modify parameters of the field device, and/or to read and display measured values of the field device.

The great advantage of the operator control unit according to the invention is that application software which cannot be executed on the first operating system of the operator control unit under normal circumstances may be executed by said system.

The emulation algorithm pretends to the execution application that this located on its second operating system required for operation, and converts all required resources and interfaces of the first operating system such that the application believes them to be resources and interfaces of the second operating system.

Via the application program which is executed on the first operating system, the application software obtains access to interfaces of the operator control unit, in particular to hardware communication interfaces, in order to establish a connection to the field device. The information necessary to be able to "understand" the field device, that is to say, in particular the command and register indexes of the field device, is contained in the application software. The coding/decoding information in order to be able to create/interpret telegrams transmitted/received via the interface are also included in the application software. The application program itself therefore does not require its own information regarding the field device to be operated.

A user, for example a service technician, thus now only requires one device, namely the operator control unit according to the invention. A second device which would normally be required to execute the application software no longer needs to be carried by the user. This plays a role in particular when the field device is used in an area subject to explosion hazard for which special security and access requirements exist. In addition, no data would need to be synchronized between the two devices. This considerably facilitates the operation or servicing of field devices for an operator.

Field devices that are mentioned in connection with the operator control unit according to the invention are already listed by way of example in the introductory part of the description.

According to a first variant, the operator control unit according to the invention has a generic communication driver which can be executed in the application program, which driver is designed to execute the emulation algorithm. The advantage with this variant is that the application program itself does not need to be changed in order to execute the execution application.

According to a second variant of the operator control unit according to the invention, it is provided that the application program is designed to execute the emulation algorithm. In this instance, the emulation algorithm is included in the code of the application program, for example.

According to a first development of the first variant of the operator control unit according to the invention, it is provided that the application program is an FDT application.

In an embodiment of the first development of the operator control unit according to the invention, it is provided that the generic communication driver is a DTM device driver.

According to a second development of the first variant of the operator control unit according to the invention, it is provided that the application program is an FDI host.

In an embodiment of the second development of the operator control unit according to the invention, it is provided that the generic communication driver is an FDI package.

According to a preferred embodiment of the operator control unit according to the invention, it is provided that the operator control unit is a computer unit, in particular a laptop; a mobile operator control unit, for example the "Field Xpert" produced and distributed by the applicant; a workstation PC; or a tablet.

A smartphone may also be used. In this instance, application software which potentially would not be executable on the operating system of the smartphone (for example iOS application software on an Android operating system, or application software for a second operating system which includes a version number which differs from the version number of the first operating system on the smartphone) may still be executed.

According to an advantageous embodiment of the operator control unit according to the invention, it is provided that the operator control unit has a communication interface for connecting the operator control unit to a wired or a wireless communication network, which communication interface can be accessed by the application software. In the event that the communication network is wired, it is in particular a service interface (for example a CDI interface offered by the applicant's field devices) or a USB interface. In the event that the communication network has a wireless design, the communication interface is in particular a Bluetooth, Zigbee, WirelessHART, or WLAN interface.

According to an advantageous embodiment of the operator control unit according to the invention, the first operating system is Microsoft Windows. However, it may also be a similar operating system of a computer unit, for example OS X or Linux. In the event of a mobile operator control unit, this is an operating system specific to this operator control unit. If the operator control unit is a smartphone, the operating system is one of the common smartphone operating systems, in particular Android, iOS, Windows Phone/Mobile, or a Linux variant.

According to an advantageous embodiment of the operator control unit according to the invention, the second operating system is an operating system of a mobile terminal, in particular iOS or Android. In addition to iOS and Android, a plurality of further second operating systems of smartphones are naturally known to the person skilled in the art, for example Windows Phone/Mobile and Linux variants.

The object is further accomplished by a generic communication driver for use in the operator control unit according to the invention.

The object is further achieved by an application program for use in the operator control unit according to the invention. Depending on the variant of the operator control unit according to the invention, the application program is configured to contain/execute a generic communication driver which contains/executes the emulation algorithm, or the emulation algorithm itself.

BRIEF DESCRIPTION OF THE DRAWING

The invention is explained in greater detail with reference to the following FIGURES. The following is shown:

FIG. 1 shows a schematic overview of an application example of the operator control unit according to the present disclosure.

DETAILED DESCRIPTION

FIG. 1 shows a schematic overview of an application example of the operator control unit BE according to the invention. In this application example, the operator control unit BE is designed as a laptop. Microsoft Windows is installed as a first operating system OS1 on the operator control unit BE.

Furthermore, an application program AW which can be run on the first operating system OS1 is installed on the operator control unit BE. The application program AW is an FDT framework application, for example the program Field-Care, which is distributed by the applicant. More detailed information regarding the FDT technology and its purpose is already provided in the introductory part of the description. Device drivers in the form of DTMs (device type managers) are normally executed in an FDT framework application in order to access a field device FG and be able to operate this. For this purpose, a communication driver CommDTM is usually provided which enables communication with the field device. By means of field device-specific device drivers DTM, for example, functions of the field device FG can then be executed, data (in particular measurement data and diagnostic data) and parameters can be read out from the field device FG, and the field device FG can be parameterized.

As has already been explained in the introductory part of the description, there is presently a plurality of application software AP for smartphones with which, for example, a field device FG can be accessed via Bluetooth and said device can often be operated in a simple manner. Frequently, the graphical user interface GUI of an application software AP has a very simple and clear structure and, under the circumstances, is more intuitively comprehensible to a user than would be the case for the user interface of a field device-specific device driver DTM.

An application software AP is only rarely compatible with operating systems OS1 for laptops and PCs, since the application software AP is specifically programmed for the operating systems OS2 of the smartphones, for example iOS or Android.

In order to execute such an application software AP on the operator control unit BE, said unit requires a special generic communication driver KT which is started and executed in the application program AW. This generic communication driver KT includes an emulation algorithm EA and allows access to a database on which a plurality of different application software AP is available, and which the operator control unit BE can access via the Internet. The database is comparable to what is known as an "app store" which can be contacted via smartphone or tablet.

A user selects one or more of the application softwares AP available in the database, whereupon they are loaded via the Internet onto the operator control unit BE and stored thereon. By means of the emulation algorithm EA, the application software AP simulates said software being executed on a second operating system OS2, that is to say, a smartphone operating system. The emulation algorithm EA converts all required resources and interfaces of the first operating system OS1 in such a way that the application AP believes them to be resources and interfaces of the second operating system OS2.

The graphical user interface GUI of the application software AP is hereby visualized to the user. Analogous to the actually intended operation, the user can operate the application software by means of a smartphone via control elements displayed on the graphical user interface GUI, for example by clicking a mouse on one of these operating elements and/or entering numerical values or letter sequences via an input device, for example a keyboard.

Via the application program AW, the application software AP receives access to a Bluetooth communication interface IF of the operator control unit BE and may connect to the field device FG by means of Bluetooth. The information required to be able to "understand" the field device FG, that is to say, in particular the command and register indexes of the field device FG, are contained in the application software AW.

The coding/decoding information in order to enable telegrams transmitted to the field device or received by the field device FG via the Bluetooth interface to be created/interpreted are also contained in the application software AP. Therefore, the application program AW itself does not require its own information regarding the field device FG to be operated.

In this way, a user AW may store and execute several types of application software AP on the operator control unit BE in order to operate field devices FG conveniently by means of the application software AP.

As an alternative to the use of a generic communication driver KT, the application program itself has the components required to execute an application software AP, that is to say, the emulation algorithm EA and the function for accessing the database. For this purpose, it can be provided that said components are contained in the code of the application program AW.

It goes without saying that the exemplary embodiments shown are solely of an exemplary nature, and the invention can be applied to any desired combinations of operator control units BE, first and second operating system OS1, OS2, and application and application programs AW, AP.

The invention claimed is:

1. An operator control unit for a field device used in automation technology, having a first operating system, comprising:
   an application program executable on the first operating system of the operator control unit; and
   an emulation algorithm configured to execute, on the application program, an application software which is executable on a second operating system, wherein the application software has at least one communication protocol for coding and/or decoding telegrams transmitted to and/or from the field device, wherein the application software is configured to read, display or modify parameters of the field device and/or read or display measured values of the field device.

2. The operator control unit of claim 1, wherein the operator control unit includes a generic communication driver executable in the application program for executing the emulation algorithm.

3. The operator control unit of claim 2, wherein the application program is an FDT application.

4. The operator control unit of claim 3, wherein the generic communication driver is a DTM device driver.

5. The operator control unit of claim 2, wherein the application program is an FDI host.

6. The operator control unit of claim 5, wherein the generic communication driver is an FDI package.

7. The operator control unit of claim 1, wherein the application program is configured to execute the emulation algorithm.

8. The operator control unit of claim 1, wherein the operator control unit is a laptop, a workstation PC, or a tablet.

9. The operator control unit of claim 1, wherein the operator control unit includes a communication interface for connecting the operator control unit to a wired or a wireless communication network, wherein the communication interface is accessible by the application software.

10. The operator control unit of claim 1, wherein the first operating system is Microsoft Windows.

11. The operator control unit of claim 1, wherein the second operating system is an operating system of a mobile terminal.

12. A generic communication driver for use in an operator control unit for a field device used in automation technology, the operator control unit having a first operating system, an application program executable on the first operating system and an emulation program configured to execute, on the application program, an application software which is executable on a second operating system, wherein the application system has at least one communication protocol for coding and/or decoding telegrams transmitted to and/or from the field device, wherein the application software is configured to read, display or modify parameters of the field device and/or read or display measured values of the field device, comprising:
- a DTM device driver or an FDI package executable in the application program for executing the emulation algorithm;
- wherein the operator control unit is a laptop, a workstation PC, or a tablet;
- wherein the operator control unit includes a communication interface for connecting the operator control unit to a wired or a wireless communication network, wherein the communication interface is accessible by the application software;
- wherein the first operating system is Microsoft Windows;
- wherein the second operating system is an operating system of a mobile terminal.

13. An application program for use in an operator control unit for a field device used in automation technology, the operator control unit having a first operating system, an application program executable on the first operating system and an emulation program configured to execute, on the application program, an application software which is executable on a second operating system, wherein the application system has at least one communication protocol for coding and/or decoding telegrams transmitted to and/or from the field device, wherein the application software is configured to read, display or modify parameters of the field device and/or read or display measured values of the field device, comprising:
- the application program is an FDT application or an FDI host configured to execute the emulation algorithm;
- wherein the operator control unit is a laptop, a workstation PC, or a tablet;
- wherein the operator control unit includes a communication interface for connecting the operator control unit to a wired or a wireless communication network, wherein the communication interface is accessible by the application software;
- wherein the first operating system is Microsoft Windows;
- wherein the second operating system is an operating system of a mobile terminal.

* * * * *